(12) United States Patent
Kim et al.

(10) Patent No.: US 8,316,325 B2
(45) Date of Patent: Nov. 20, 2012

(54) MOBILE TERMINAL AND METHOD FOR CONTROLLING SCREEN THEREOF

(75) Inventors: Eui-Kyeom Kim, Gyeonggi-Do (KR); Hee-Young Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 772 days.

(21) Appl. No.: 11/763,360

(22) Filed: Jun. 14, 2007

(65) Prior Publication Data

US 2008/0005682 A1    Jan. 3, 2008

(30) Foreign Application Priority Data

Jun. 29, 2006 (KR) .................. 10-2006-0059950
Nov. 17, 2006 (KR) .................. 10-2006-0114137

(51) Int. Cl.
*G06F 3/023* (2006.01)
*G06F 3/048* (2006.01)
*H04M 1/274* (2006.01)

(52) U.S. Cl. .................. 715/864; 715/867; 715/762

(58) Field of Classification Search .................. 715/864, 715/867, 762
See application file for complete search history.

(56) References Cited

U.S. PATENT DOCUMENTS

| | | | | |
|---|---|---|---|---|
| 6,020,881 | A  * | 2/2000 | Naughton et al. | 715/740 |
| 6,941,160 | B2 * | 9/2005 | Otsuka et al. | 455/566 |
| 7,113,809 | B2 * | 9/2006 | Noesgaard et al. | 715/867 |
| 7,123,945 | B2 * | 10/2006 | Kokubo | 715/790 |
| 2003/0045331 | A1 * | 3/2003 | Montebovi | 455/566 |
| 2003/0046401 | A1 * | 3/2003 | Abbott et al. | 709/228 |
| 2003/0083106 | A1 * | 5/2003 | Seo | 455/566 |
| 2003/0119562 | A1 * | 6/2003 | Kokubo | 455/566 |
| 2006/0020904 | A1 * | 1/2006 | Aaltonen et al. | 715/850 |
| 2006/0099938 | A1 * | 5/2006 | Lee | 455/418 |
| 2006/0168545 | A1 * | 7/2006 | Niittynen et al. | 715/848 |

FOREIGN PATENT DOCUMENTS

| | | |
|---|---|---|
| KR | 1020050077266 | 8/2005 |
| KR | 10-2005-0089362 | 9/2005 |
| KR | 1020060023587 | 3/2006 |
| KR | 10-0595706 | 7/2006 |
| KR | 10-0628765 | 9/2006 |

* cited by examiner

*Primary Examiner* — Jordany Nunez
(74) *Attorney, Agent, or Firm* — Lee, Hong, Degerman, Kang & Waimey (57) ABSTRACT

A mobile terminal capable of allowing a user to rapidly and easily recognize a list of multi-tasks being executed is provided. The mobile terminal includes one or more bodies, an input unit performing a key input or a touch input, a display unit displaying a task execution screen and a controller displaying a list of tasks being executed when the mobile terminal is in a preset operation mode set by operating the body or the input unit.

18 Claims, 5 Drawing Sheets

MOBILE TERMINAL AND METHOD FOR CONTROLLING SCREEN THEREOF

CROSS-REFERENCE TO RELATED APPLICATIONS

Pursuant to 35 U.S.C. §119(a), this application claims the benefit of earlier filing dates and right of priority to Korean Application No. 10-2006-0059950, filed on Jun. 29, 2006 and Korean Application No. 10-2006-0114137, filed on Nov. 17, 2006, which are herein expressly incorporated by reference in their entirety.

FIELD OF THE INVENTION

The present disclosure is directed to a mobile terminal and a method for controlling a screen thereof.

DESCRIPTION OF THE RELATED ART

Related art mobile terminals were not provided with a multi-tasking function due to lack of user desire and technical limitations. However, a multi-tasking function has been applied to mobile terminals as digital devices have been combined in the last several years. As user demand for multi-tasking functions has increased, a user interface that facilitates convenient utilization of a multi-tasking function is required.

SUMMARY OF THE INVENTION

In one aspect of the present invention, a method for controlling a screen of a mobile terminal is provided. The method includes executing one or more tasks and displaying a list of the one or more tasks being executed when the mobile terminal is in a preset operation mode.

It is contemplated that the task list is displayed when the mobile terminal is converted from a standby state to an idle state. It is further contemplated that the task list is displayed when the mobile terminal is converted from an idle state to a standby state.

It is contemplated that the task list is displayed upon receiving one of a predetermined key input and a predetermined touch input when the mobile terminal is in one of a standby state and an idle state. It is further contemplated that the task list is displayed when another task exists after finishing the one or more tasks being executed.

It is contemplated that displaying the task list includes displaying an icon related to each of the one or more tasks, each icon including one of a moving image and a stationary image. It is further contemplated that the icon related to each of the one or more tasks includes an image indicating one of contents and a function of information included in the corresponding task.

It is contemplated that displaying the task list includes displaying an indicator on a predetermined region of a display unit when a number of tasks being executed is at least two. It is further contemplated that the task list is displayed on a predetermined region of a display unit in a tab form. Preferably, the task list is displayed on a predetermined region of a display unit in one of a scroll manner and a pop up manner.

In another aspect of the present invention, a mobile terminal is provided. The mobile terminal includes one or more bodies, an input unit performing at least one of a key input and a touch input, a display unit displaying a task execution screen and a controller controlling the display unit to display a list of tasks being executed when the mobile terminal is in a preset operation mode according to manipulation of the one or more bodies and the input unit.

It is contemplated that the controller displays the task list when the mobile terminal is converted from a standby state to an idle state. It is further contemplated that the controller displays the task list when the mobile terminal is converted from an idle state to a standby state.

It is contemplated that the controller displays the task list upon receipt of one of a predetermined key input and a predetermined touch input when the mobile terminal is in one of a standby state and an idle state. It is further contemplated that the mobile terminal further includes a memory unit storing an icon corresponding to each of the tasks being executed, the icon including one of a moving image and a stationary image.

It is contemplated that the controller displays an indicator on a predetermined region of the display unit when a number of tasks being executed is at least two. It is further contemplated that the controller displays the task list on a predetermined region of the display unit in a tab form.

It is contemplated that the controller displays the task list on the display unit in one of a scroll manner and a pop up manner. It is further contemplated that the controller deletes the task list when a predetermined time lapses after the mobile terminal is converted from a standby state to an idle state.

It is contemplated that the controller deletes the task list upon receipt of one of a predetermined key input and a predetermined touch input when the mobile terminal is in a standby state. It is further contemplated that the controller displays and deletes the task in a toggle manner upon receipt of the same one of a predetermined key input and a predetermined touch input. Preferably the mobile terminal further includes a memory unit and wherein the controller stores information related to each of the tasks being executed in the memory and continuously stores the information related to any of the tasks being executed whose execution is not finished.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
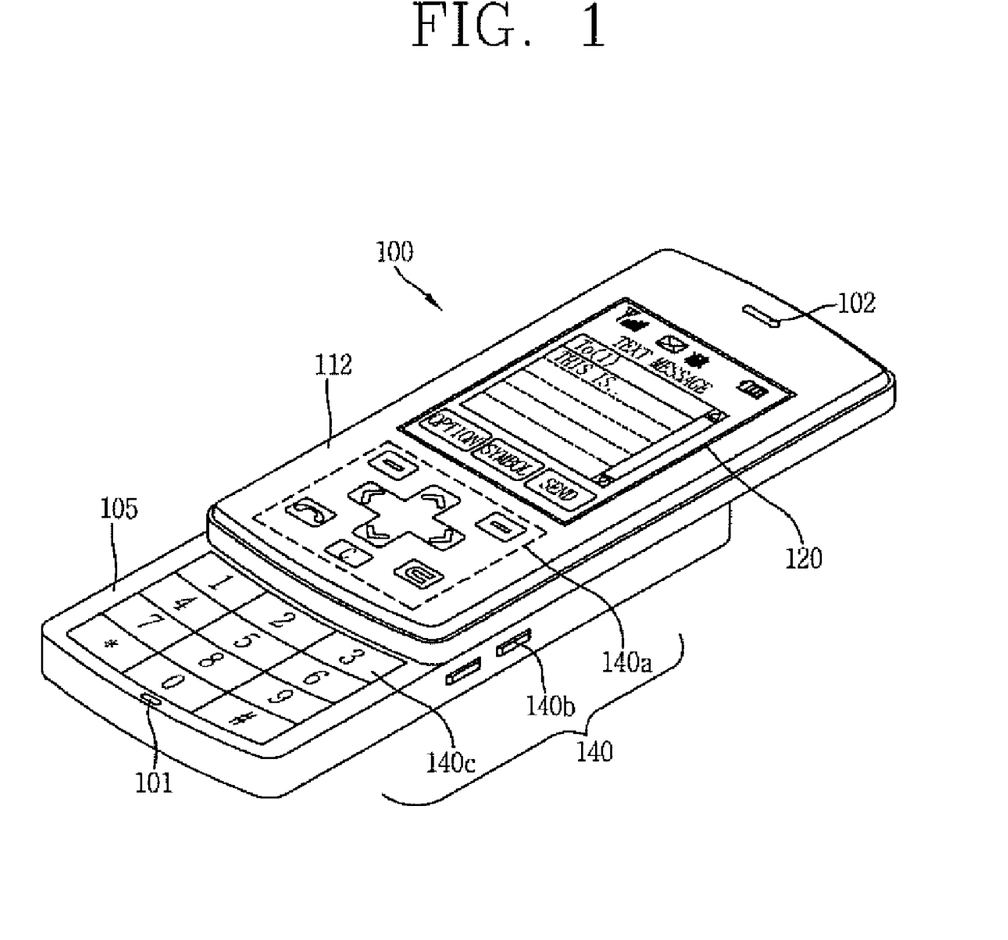
FIG. 1 illustrates the appearance of a mobile terminal according to the present invention.
Figure 2:
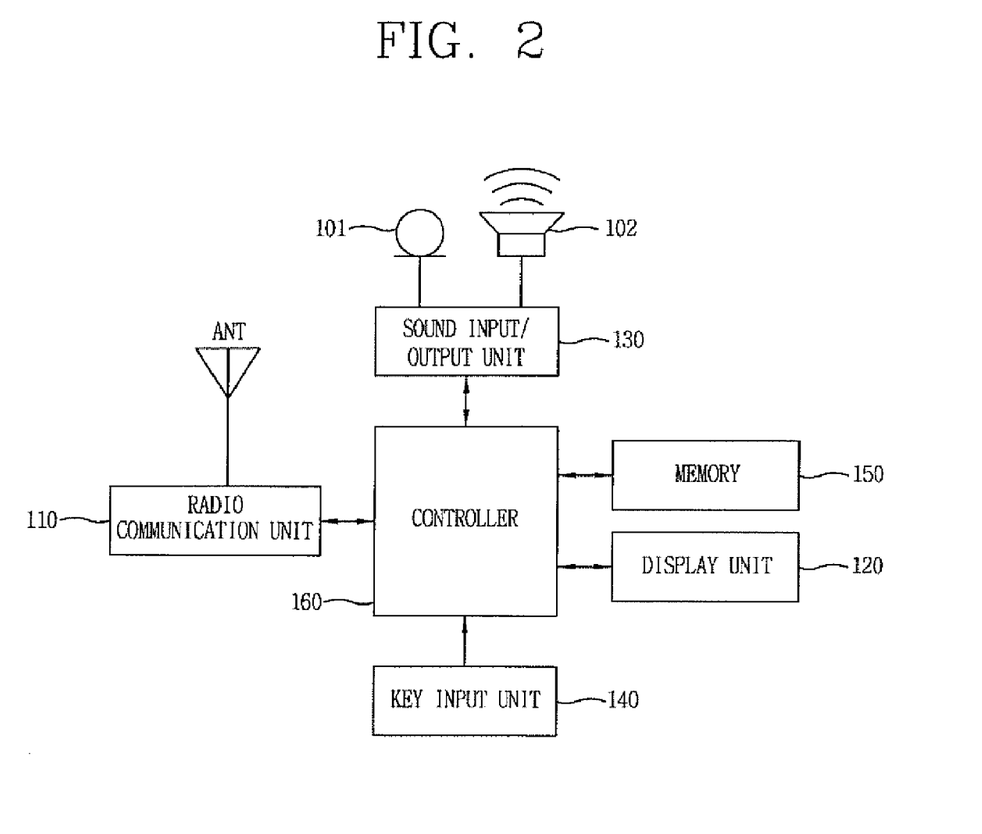
FIG. 2 is a block diagram illustrating a configuration of a mobile terminal according to the present invention.

Reference will now be made in detail to the preferred embodiments of the present disclosure, examples of which are illustrated in the accompanying drawings. FIG. 1 illustrates the appearance of a mobile terminal 100 according to the present invention. FIG. 2 is a block diagram illustrating a configuration of the mobile terminal 100 according to the present invention.

The mobile terminal 100 illustrated FIG. 1 is a slide type mobile terminal. However, the present disclosure may be applied to a bar type, a folder type, a swivel type, or a swing type mobile terminal.

The present disclosure may also be applied not only to a mobile terminal, but also to any electronic, device such as a smart phone, a personal digital assistant (PDA), a portable media player (PMP), a laptop computer and a portable game player. The mobile terminal 100 has integrated functions, such as a broadcasting/receiving function, a camera function, a multimedia file reproducing function, a game playing function, a wire/radio network function and a text message transceiving function.

As illustrated in FIG. 1, the mobile terminal 100 includes a first body 105, a second body 112 slidably coupled to the first body, a display unit 120 located on at least one of the first body and the second body, and a key input unit 140 located on at least one of the first body and the second body. As illustrated in FIG. 2, the mobile terminal 100 includes a radio communication unit 110 located in at least one of the first body 105 and the second body 112, a display unit 120, a sound input/output unit 130, a key input unit 140, a memory 150, and a controller.

The radio communication unit 110 receives and transmits audio and data signals through an antenna ANT. The radio communication unit 110 is electrically connected to the controller 160 and performs radio communication under control of the controller.

The radio communication unit 110 is not limited to a specific communication method. For example, the radio communication unit 110 may incorporate various communication methods, such as CDMA, GSM, GPRS, TDMA, IMT-2000, WCDMA, HSDPA, IEEE802.11, and IEEE802.16.

The display unit 120 displays information related to an operation and each function implementation of the mobile terminal 100, as well as a multi-tasking list under control of the controller 160. The display unit 120 may be implemented as a liquid crystal display (LCD) or an organic light emitting diode (OLDE).

The sound input/output unit 130 processes, under control of the controller 160, audio signals received and transmitted through the radio communication unit 110 and includes a microphone 101 and a speaker 102. The sound input/output unit 130 outputs, via the speaker 102, sound generated when the mobile terminal performs each function.

The key input unit 140 processes inputs via keys and outputs the signals to the controller 160. As illustrated in FIG. 1, the key input unit 140 may be constructed such that it is always exposed (140a, 140b) or may be constructed such that it is exposed only when the second body 112 is opened (140c).

The key input unit 140 and the display unit 120 are generally constructed such that they are separated from each other. However, the key input unit 140 and the display unit 120 may be integrally constructed as a single touch screen.

The memory 150 stores each operation program, each function program, and data for controlling the mobile terminal 100. In the present invention, information related to tasks being activated may be stored in the memory 150.

The memory 150 may be implemented as an electrically erasable programmable read-only memory (EEPROM), a dynamically random access memory (DRAM), a stationary ally random access memory (SRAM), a flash memory, a nand flash or a hard disc. However, the memory 150 is not limited to these constructions.

The controller 160 detects tasks executed according to an operation mode of the mobile terminal 100, and displays a multitasking list in a preset manner. Specifically, the controller 160 stores information related to tasks simultaneously executed in the memory 150 and displays a list of the tasks in a preset manner when the mobile terminal 100 is in a predetermined operation mode.

The operation mode indicates that the mobile terminal 100 is converted into a standby state from an idle state. Herein, the idle state indicates that only minimum functions relating to radio transmission/reception for the mobile terminal are performed for power saving. The standby state indicates that a user command may be input and executed. A standby screen is displayed before a user's command is input.

A standby screen is displayed for a certain time when the mobile terminal 100 is converted into a standby state from an idle state. The standby screen is no longer displayed after the certain time elapses.

The mobile terminal 100 is converted from the idle state into the standby state when the first 105 and second 112 bodies moved into an open state from a closed state or when an optional key input or touch input is performed using the key input unit 140. The standby screen is displayed for a predetermined time after the mobile terminal is converted from the idle state into the standby state and a user can execute a desired function during the predetermined time.

When the first body 105 or the second body 112 is closed such that the mobile terminal 100 is converted from the standby state into the idle state, information related to tasks executed prior to the conversion is stored in the memory 150. A task list previously stored in the memory 150 is displayed on the display unit 120 when the first body 105 or the second body 112 is opened or when the optional key input or touch input is received such that the mobile terminal 100 is converted into the standby state from the idle state. The controller may check whether or not the tasks are being executed before displaying the task list.

As illustrated in FIG. 4, the task list may be displayed on a predetermined region of the display unit 120 in a tab form 202. The task list is displayed at a lower end of the display unit in a preferred embodiment of the present invention. However, the task list may be positioned at a right, left, upper, lower, or central side of the display unit 120 and may be displayed in a scroll manner, such as pull-down or pull-up, or in a pop-up manner.

Each of the tasks may be displayed using an icon. The icon is an image related to contents or the kind of information included in a task being executed and may be a moving image or a stationary image.

The controller 160 may additionally display an indicator 201 on a certain region of the display unit that a predetermined number of tasks are being executed. The indicator is displayed on an upper end of the display unit in a preferred embodiment.

The controller 160 may display a standby screen instead of the task list on the display unit 120 when the number of tasks executed prior to conversion of the mobile terminal 100 to the idle state is less than a predetermined number. The standby screen may be at least one of a clock, a calendar, a stationary image set by a user or set as a default, or a moving image.

Figure 3:
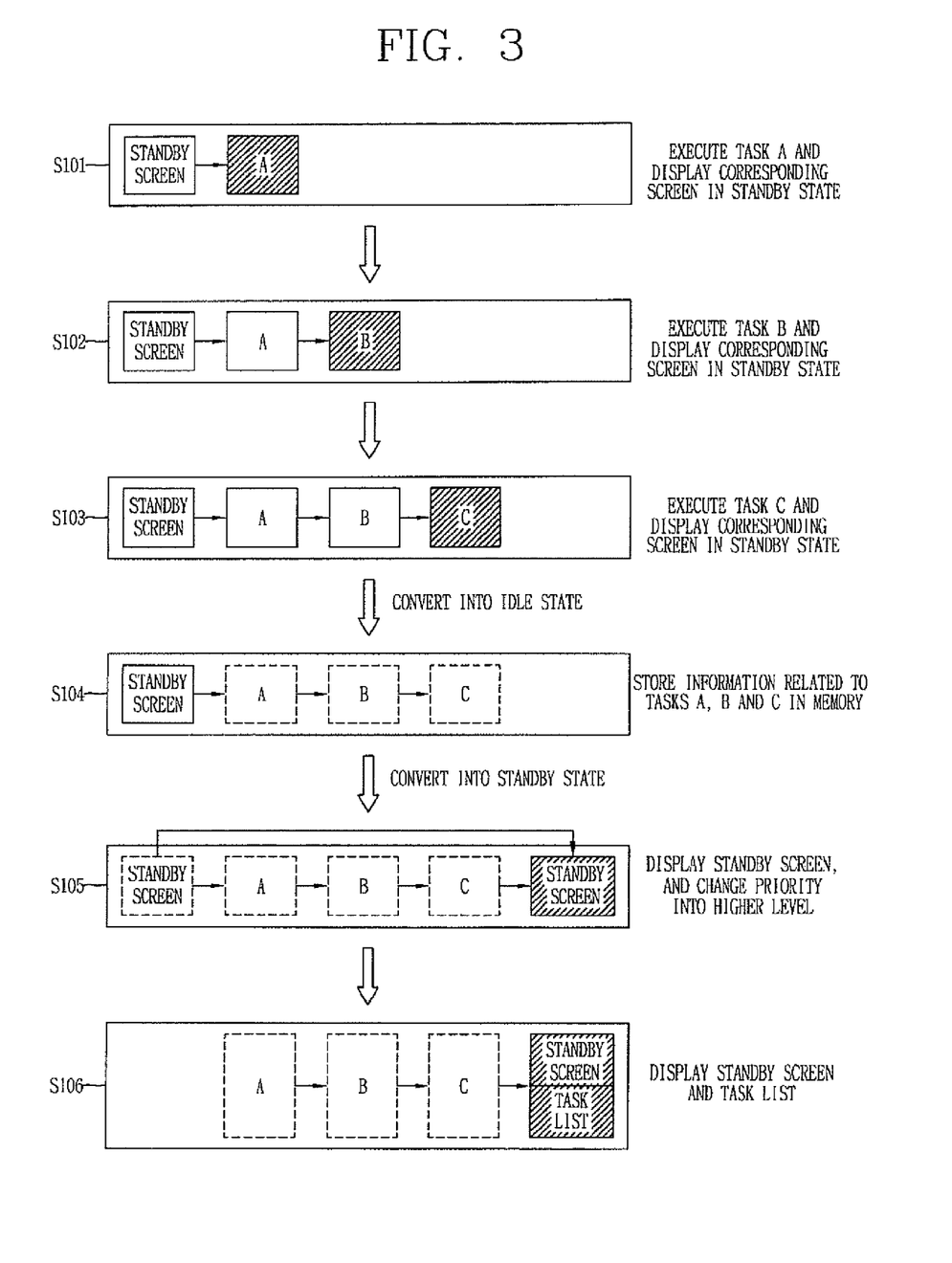
FIG. 3 illustrates a process for displaying a task list according to an operation mode of a mobile terminal according to the present invention.

Operation of the mobile terminal will be explained with reference to FIGS. 3 and 4. FIG. 3 illustrates a process for displaying a task list according to an operation mode of the mobile terminal 100. FIG. 4 illustrates execution screens converted according to an operation mode of the mobile terminal 100.

Figure 4A:
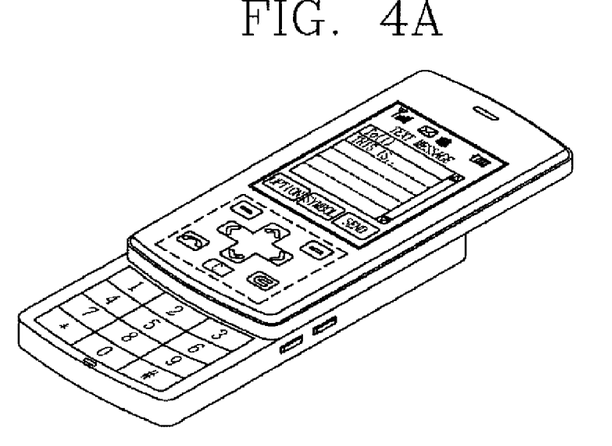
FIG. 4 illustrates execution screens converted according to an operation mode of a mobile terminal according to the present invention.

As illustrated in FIG. 3, the controller 160 displays an execution screen for a task A that is executed by a user when the mobile terminal 100 is converted from an idle state to a standby state by opening the first body 105 or second body 112 (S101). For example, the controller 160 displays a message writing screen as illustrated in FIG. 4A if the task A is a message writing task.

When the user executes task B while task A is still in progress, the controller 160 displays an execution screen for task B in place of the execution screen for task A (S102). The latest executed task has a higher priority than a previously executed task. Therefore, the execution screen for task B, having a higher priority than task A, is displayed. For example, the controller 160 displays an Internet access screen having a higher priority while hiding a message writing screen if the user accesses to the Internet while writing a message, When the user executes task C while task B is sill in progress, the controller 160 displays an execution screen for task C in place of the execution screen for task B (S103). Herein, the latest task has a higher priority than the previously executed task. Since task C has a higher priority than task A and task B, the execution screen for task C is displayed. For example, the controller 160 displays a broadcasting screen having a higher priority while hiding the Internet access screen if the user receives a broadcasting message while accessing the Internet.

The controller 160 stores information related to tasks A, B and C in the memory 150 (S104) when each of the tasks is executed. Therefore, information related to a task being executed is continuously stored in the memory 150 until the user finishes executing the task.

Figure 4B:
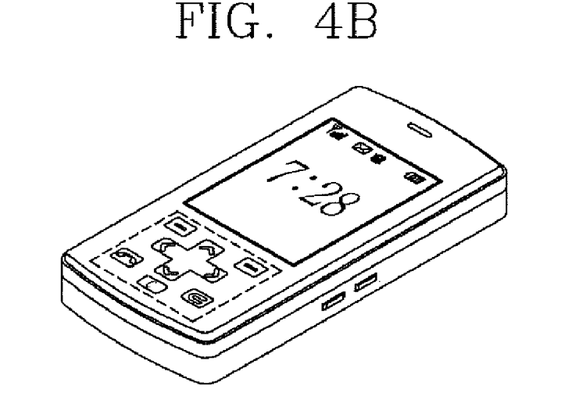

For example, the controller 160 maintains the information related to tasks A, B and C stored in the memory 150 when the user converts the mobile terminal 100 to an idle state by closing the first body 105 or second body 112 while tasks A, B and C are being executed, (S104). The controller 160 then displays a standby screen for a predetermined time (S105). The standby screen is a screen that displays a clock as illustrated in FIG. 4B.

A list of the tasks is displayed in a preset manner when the mobile terminal 100 is in a predetermined operation mode. For example, a list of tasks executed prior to conversion of the mobile terminal 100 to the idle state is displayed when the mobile terminal is again converted to a standby state from an idle state (S106).

The predetermined operation mode indicates that the mobile terminal 100 is in a standby state when the first 105 and second 112 bodies are opened or when a key input or a touch input is received when the first and second bodies are closed. The predetermined operation mode may indicate that a specific key or touch input is received to display a task list in the standby state.

Figure 4C:
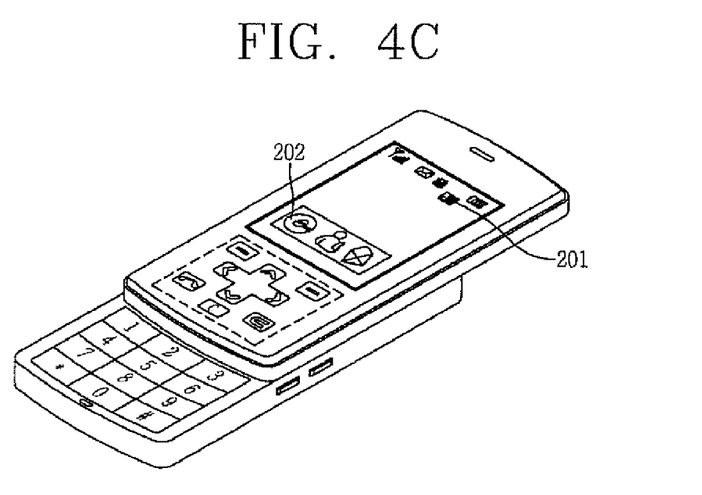

As illustrated in FIG. 4C, the task list is displayed at a lower end of the display unit 120 in a tab form. The controller 160 may display an indicator that a predetermined number of tasks are being executed on an upper end of the display unit 120. Preferably, the task list is displayed when the number of tasks being executed is more than two.

The user may select a desired task by moving a directional key when the task list is displayed. The controller 160 displays an execution screen corresponding to the selected task by changing a priority of the selected task.

Figure 5:
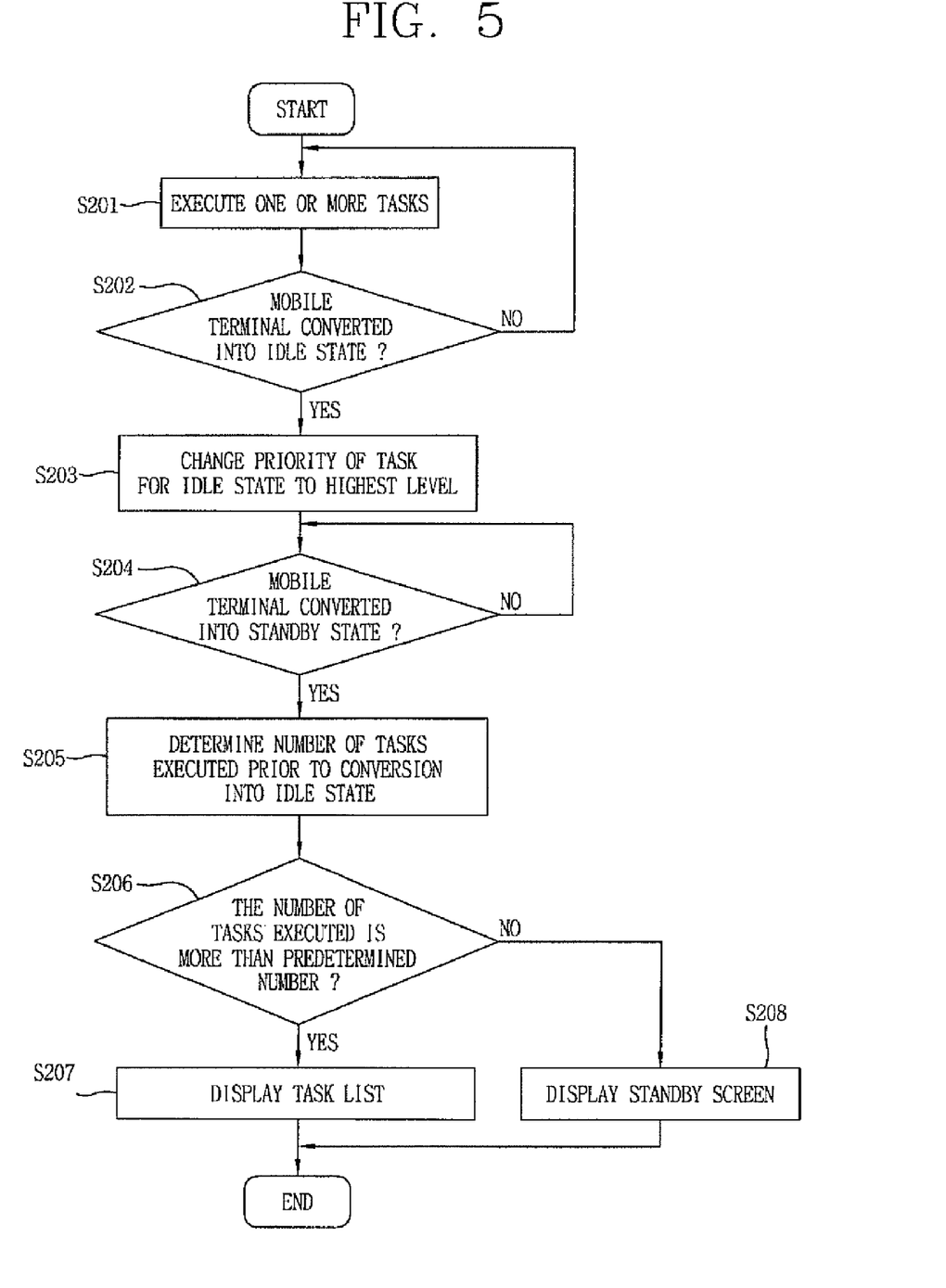
FIG. 5 is a flowchart illustrating a method for controlling a screen of a mobile terminal according to the present invention.

FIG. 5 is a flowchart illustrating a method for controlling a screen of a mobile terminal 100 according to the present invention. As illustrated in FIG. 5, when one or more tasks are being executed by a user (S201) and the mobile terminal 100 is converted to an idle state by closing the first body 105 or the second body 112 (S202), the controller 160 displays a standby screen for a predetermined time and changes a priority of a task for the idle state to a highest level (S203).

When the mobile terminal 100 is converted to a standby state by opening the first 105 and second 112 bodies or upon receipt of a key input or touch input when the first and second bodies are closed (S204), the controller 160 determines the number of tasks executed prior to the conversion to the idle state (S205). The number of the tasks executed can be determined according to information stored in the memory 150.

When the number of tasks executed prior to conversion of the mobile terminal 100 to the idle state is more than a predetermined number (S206), the controller 160 displays a task list (S207). The task list may be displayed in a tab form and an indicator that two or more tasks are being executed may additionally be displayed. When the number of tasks executed prior to conversion of the mobile terminal 100 to the idle state is less than the predetermined number (S206), only a standby screen is displayed (S208).

The controller 160 deletes the task list when the mobile terminal 100 is converted to the idle state from the standby state. The controller may delete the task list upon receipt of a specific key input or touch input.

Deleting the task list refers to not displaying the task list. The task list may be displayed or deleted in a toggle manner.

In the present invention, tasks being executed in a mobile terminal are displayed, thereby enabling a user to check whether multi-tasking is being performed. Accordingly, a currently executed task is prevented from being dually executed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling a display of a mobile terminal, the method comprising:
   displaying images execution screens related to a plurality of tasks on the display of the mobile terminal, the plurality of tasks executed during a standby state of the mobile terminal;
   storing information related to the plurality of tasks in a memory of the mobile terminal;
   hiding the execution screens on the display of the mobile terminal when an operational mode of the mobile terminal is converted to an idle state;
   displaying a list of the plurality of tasks executed during the standby state on the display of the mobile terminal based on the information related to the plurality of tasks in response to a conversion of the operational mode of the mobile terminal from the idle state back to the standby state; and
   displaying the execution screen corresponding to one of the plurality of tasks on the display of the mobile terminal when the one of the plurality of tasks is selected from the list of the plurality of tasks,
   wherein the standby state indicates the operational mode of the mobile terminal during which a user command is entered and executed,
   wherein the idle state indicates the operational mode of the mobile terminal during which only minimum functions relating to radio transmission/reception for the mobile terminal are performed;
   wherein displaying the list of the plurality of tasks executed during the standby state comprises displaying an icon related to each of the plurality of tasks, the icon comprising a moving image or a stationary image; and
   wherein the icon related to each of the plurality of tasks comprises an image indicating either contents or a type of information associated with each of the plurality of tasks.

2. The method of claim 1, wherein the standby state is triggered by receiving a predetermined key input or a predetermined touch input when the operational mode of the mobile terminal is the idle state.

3. The method of claim 1, further comprising displaying the list of the plurality of tasks executed during the standby state when the mobile terminal is opened.

4. The method of claim 1, wherein displaying the list of the plurality of tasks executed during the standby state comprises displaying an indicator on a predetermined region of the display.

5. The method of claim 1, wherein displaying the list of the plurality of tasks executed during the standby state comprises displaying the list on a predetermined region of the display in a tab form.

6. The method of claim 1, wherein displaying the list of the plurality of tasks executed during the standby state comprises displaying the list on a predetermined region of the display in a scroll manner or a pop up manner.

7. The method of claim 1, wherein displaying the list of the plurality of tasks executed during the standby state comprises:
   determining whether a number of the plurality of tasks is greater than a predetermined number of two or more; and
   displaying the list of the plurality of tasks in response to the conversion of the operational mode only if it is determined that the number of the plurality of tasks is greater than the predetermined number.

8. The method of claim 1, further comprising prioritizing the plurality of tasks executed during the standby state based on their respective orders of execution.

9. A mobile terminal comprising:
   one or more bodies;
   an input unit configured to process at least a key input or a touch input;
   a display unit configured to display execution screens related to a plurality of tasks;
   a memory unit configured to store information; and a controller configured to: control the display unit to display the execution screens related to the plurality of tasks during a standby state of the mobile terminal in response to manipulation of the one or more bodies or the input unit;
   control the memory unit to store information related to the plurality of tasks;
   hide the execution screens related to the plurality of tasks on the display unit when an operational mode of the mobile terminal is converted into an idle state;
   display a list of the plurality of tasks executed during the standby state on the display unit based on the information related to the plurality of tasks in response to a conversion of the operational mode of the mobile terminal from the idle state back to the standby state; and
   display the execution screen corresponding to one of the plurality of tasks on the display of the mobile terminal when the one of the plurality of tasks is selected from the list of the plurality of tasks,
   wherein the standby state indicates the operational mode of the mobile terminal during which a user command is entered and executed,
   wherein the idle state indicates the operational mode of the mobile terminal during which only minimum functions relating to radio transmission/reception for the mobile terminal are performed;
   wherein the controller is further configured to control the display unit to display the list of the plurality of tasks executed during the standby state by displaying an icon related to each of the plurality of tasks, the icon comprising a moving image or a stationary image: and
   wherein the icon related to each of the plurality of tasks comprises an image indicating either contents or a type of information associated with each of the plurality of tasks.

10. The mobile terminal of claim 9, wherein the standby state is triggered by opening the one or more bodies.

11. The mobile terminal of claim 9, wherein the memory unit is further configured to store the icon corresponding to each of the plurality of tasks.

12. The mobile terminal of claim 9, wherein the controller is further configured to control the display unit to display an indicator on a predetermined region of the display unit.

13. The mobile terminal of claim 9, wherein the controller is further configured to control the display unit to display the list of the plurality of tasks executed during the standby state on a predetermined region of the display unit in a tab form.

14. The mobile terminal of claim 9, wherein the controller is further configured to control the display unit to display the list of the plurality of tasks executed during the standby state in a scroll manner or a pop up manner.

15. The mobile terminal of claim 9, wherein the controller is further configured to control the display unit to hide the execution screens when a predetermined time lapses after the operational mode of the mobile terminal is converted from the standby state to the idle state.

16. The mobile terminal of claim 9, wherein the controller is further configured to control the display unit to hide the execution screens upon receipt of a predetermined key input or a predetermined touch input when the operational mode of the mobile terminal is the standby state.

17. The mobile terminal of claim 9, wherein the controller is further configured to control the display unit to display or hide the execution screens in a toggle manner.

18. The mobile terminal of claim 9, wherein the idle state is triggered when the one or more bodies are closed.

* * * * *